United States Patent [19]
Richardson et al.

[11] Patent Number: 5,979,107
[45] Date of Patent: Nov. 9, 1999

[54] ELECTRONIC FLY POPULATION CONTROL APPARATUS

[76] Inventors: Robert H. Richardson, 208 Sylvan Dr., Hayesville, N.C. 28904; David P. Meade, 89 Howell Rd., Freehold, N.J. 07728

[21] Appl. No.: 08/863,972

[22] Filed: May 27, 1997

[51] Int. Cl.⁶ .................................................... A01M 1/22
[52] U.S. Cl. ................................................................. 43/112
[58] Field of Search ........................... 43/98, 112, 132.1; 174/113 C; 256/117 F, 10

[56] References Cited

U.S. PATENT DOCUMENTS

| | | | |
|---|---|---|---|
| 4,299,048 | 11/1981 | Bayes | 43/98 |
| 4,839,984 | 6/1989 | Saunders | 43/112 |
| 5,036,166 | 7/1991 | Monopoli | 174/128.1 |
| 5,325,624 | 7/1994 | Richardson . | |
| 5,570,537 | 11/1996 | Black | 43/112 |

*Primary Examiner*—Jack W. Lavinder

[57] ABSTRACT

An improved non-toxic, non-chemical, non-polluting, inexpensive electronic apparatus to control the fly population within an animal or poultry enclosure which kills by destroying the nervous system of the fly with a brief burst of high voltage oscillations that is applied to a pair of closely spaced parallel conductors every 3 to 4 seconds.

3 Claims, 3 Drawing Sheets

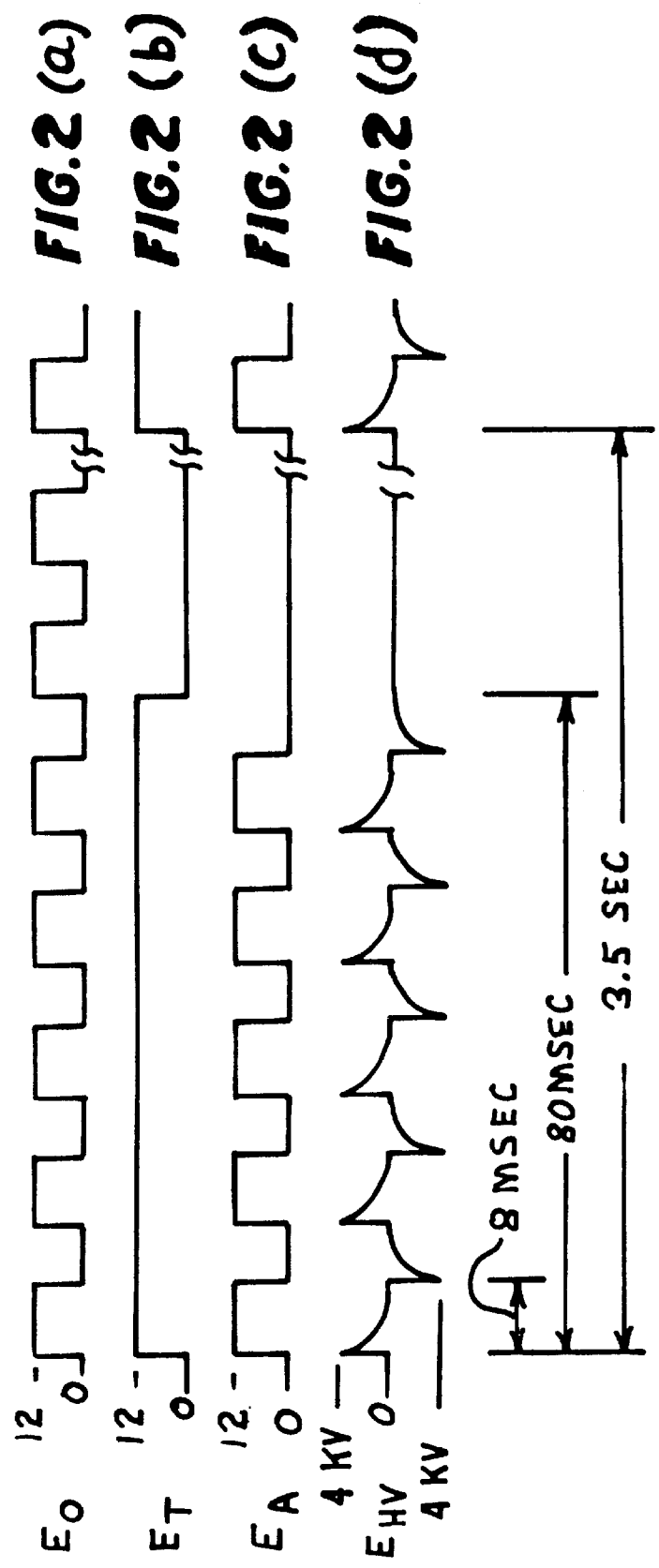

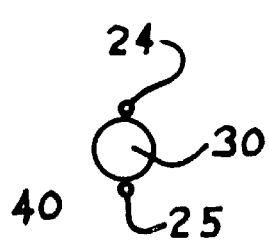
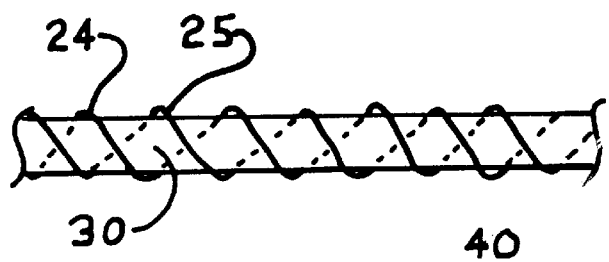
FIG. 3  FIG. 4
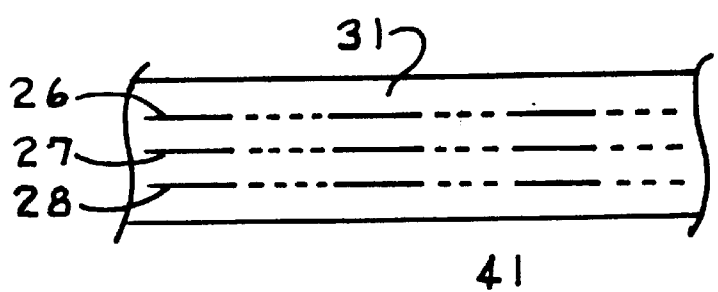
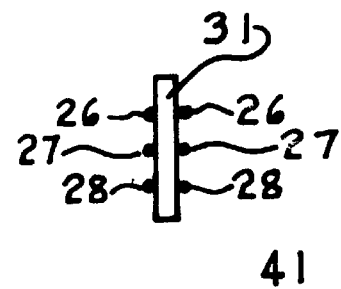
FIG. 5  FIG. 6

ELECTRONIC FLY POPULATION CONTROL APPARATUS

TECHNICAL FIELD

This invention relates to an improved apparatus for the control of fly populations, specifically to a non-toxic, non-chemical electronic means for reducing the fly population within an animal or poultry shelter, waste management facility, or processing facility by applying a brief burst of high voltage oscillations to a pair of exposed parallel conductors that attract flies as a roosting site and destroys flies which come in contact with the conductors.

BACKGROUND ART

U.S. Pat. No. 5,325,624 issued to Richardson et al on Jul. 5, 1994 addressed the problems in the prior art that had limited their use and prevented them from becoming commercially acceptable products. U.S. Pat. No. 5,325,624 disclosed a non-toxic, non-chemical, non-polluting electronic apparatus to control the fly population within an animal or poultry enclosure which does not kill by electrocution or incineration but rather by destroying the nervous system of the fly with a short burst of high voltage oscillations that is applied to a pair of parallel conductors every 1 to 5 seconds. This apparatus has been sold under the name Fly Pop'R since 1992 and is presently distributed by Insect Guard Inc. of Freehold, N.J.

OBJECT AND ADVANTAGES

An objective of this invention is to disclose an improved apparatus that will address those applications in areas where the AC power required for operation of the systems disclosed in the prior art is not available, such as remote locations throughout the world and the many farms where AC power is unacceptable because of religious beliefs.

Another objective of this invention is to disclose an improved fly population control apparatus that provides increased killing capability with no necessary increase in output power from the electronics and thus a system that is still safe for humans and safe for the building environment where it is likely to be installed.

An advantage disclosed in U.S. Pat. No. 5,325,624 is that the parallel conductors are not limited to straight runs but can be installed in any pattern desired as long as the proper spacing between the conductors is maintained. An object of this invention is to disclose an improved roosting wire system that gives more killing surface per linear distance installed. An advantage of this improved system is the use of low resistance conductors instead of stainless steel as was required by the stretched parallel wires in the prior art. The high electrical resistance, thermal sensitivity and mechanical stiffness of the stainless steel wire limited its use as the parallel conductors in the roosting means.

Another advantage of this invention is the improved operation and safety of a moisture proofed roosting means so that humidity does not cause arcing and rapid failure of the insulating materials used to properly space the parallel conductors.

Another object of this invention is to disclose a killing means that maintains all of the advantages of the parallel conductors disclosed in U.S. Pat. No. 5,325,624 and is easier to install, inexpensive, efficient, safe, moisture proof, and is easier to maintain.

Further objects and advantages of our invention will become apparent from a consideration of the drawings and ensuing description.

SUMMARY OF THE INVENTION

According to this invention in one form the electronic control unit is powered from a 12 volt storage battery. The electronics contain a voltage regulator to supply regulated voltages to the other circuits, an oscillator to generate the input to a transformer driver circuit, a timing circuit to gate the oscillator output to the transformer driver, a HV transformer that generates the high voltage necessary to operate the killing wires and a pair of parallel conductors spirally wound onto a moisture proofed cord or woven into a moisture proofed flat tape that serves as a roosting site for the flies and delivers the necessary energy to cause the death of any fly in contact with these conductors.

BRIEF DESCRIPTION OF DRAWINGS

In the drawings,

FIG. 2(a)–2(d) show voltage waveforms at points in the electronics of the first embodiment.

FIG. 3 is a cross section of a roosting cord.

FIG. 4 shows a linear section of the roosting cord.

FIG. 5 shows a linear section of a roosting tape.

FIG. 6 shows a cross section of the rootsing tape.

DESCRIPTION

Figure 1:
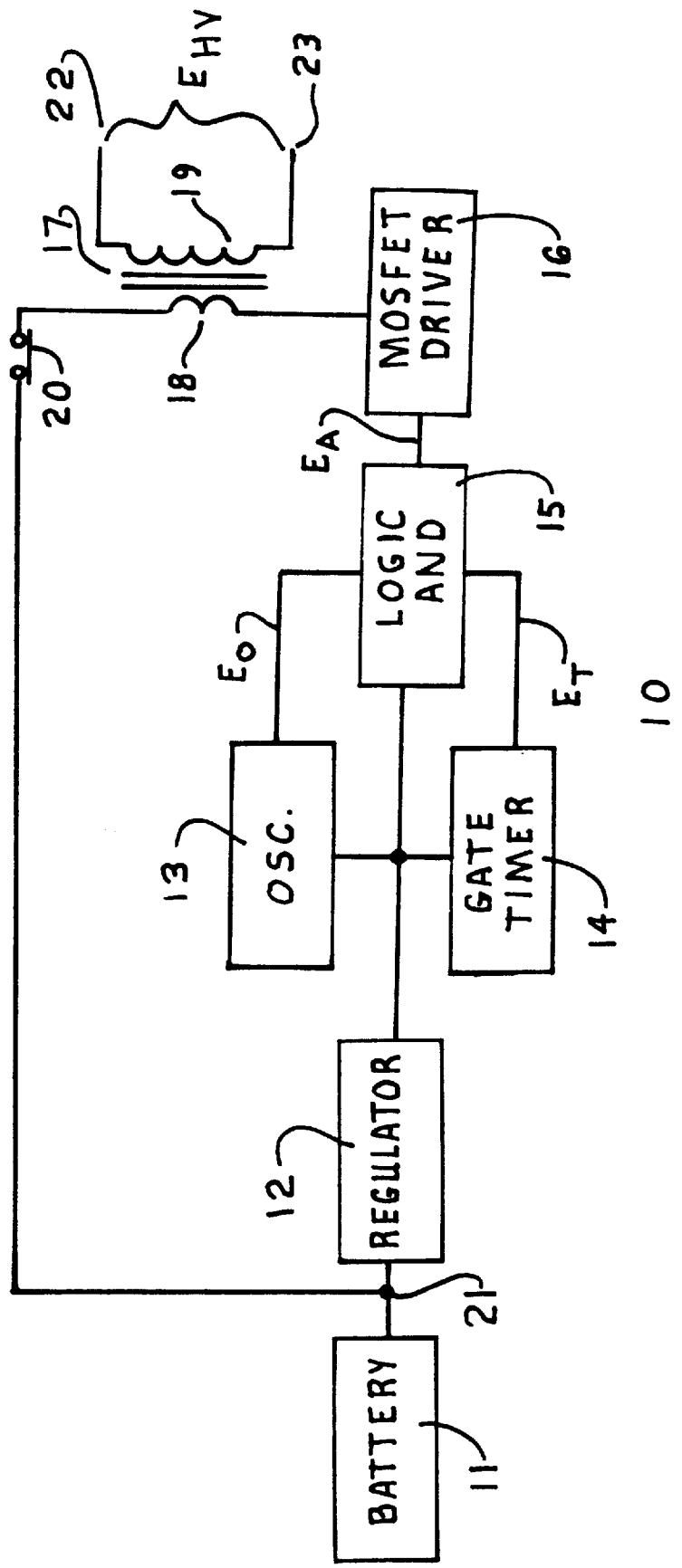
FIG. 1 is a block diagram illustrating a first embodiment of the invention.

A typical embodiment of the electronics 10 of the present invention is illustrated in FIG. 1. A circuit 21 is provided which is connected to a DC power source 11 such as a storage battery 11 that supplies the 12 VDC for circuit operation. While this invention is described and explained throughout this application with reference to a 12 VDC battery power source 11, it will be recognized that this invention can be adaped to operate with any DC voltage source.

In FIG. 1, an electronic circuit 21 is connected to a DC power source 11 which supplies the DC electrical power. This DC power is connected via circuit 21 to a normally closed thermostat 20 which is physically mounted on a HV transformer 17 and will open and thus remove the power from the HV transformer 17 if the transformer temperature rises to 65 degrees C. This is necessary to protect the transformer 17 from overheating if a failure should occur that would cause current to flow continually through the transformer 17.

The DC power 11 is also connected via circuit 21 to a voltage regulator 12 that provides regulated DC power to an oscillator 13 and a gate timer 14.

The oscillator 13 produces a continuous square wave output at 60 HZ that is one input to a logic AND 15 circuit.

The gate timer 14 produces an 80 millisecond gate signal every 3.5 seconds. This gate signal is a second input to the logic AND 15 circuit. The output of the logic AND 15 circuit is then 5 cycles of a 60 HZ squarewave that occurs once every 3.5 seconds. This burst of 5 cycles is the input to a MOSFET driver 16 circuit. This input causes the MOSFET driver 16 to turn on and off 5 times during this 80 millisecond gate. When turned on, the current through the MOSFET Driver 16 is drawn through the primary 18 of the HV transformer 17. This current through the primary 18 of the HV transformer 17 produces a high voltage pulse in the secondary 19 which is connected to high voltage wires 22 and 23. When turned OFF, the current through the primary 18 of the HV transformer 17 is instantly cut off which produces another high voltage pulse in the secondary 19 but of opposite polarity. These pulses are illustrated in FIG. 2 (d). The high voltage oscillations from the secondary 19 of transformer 17 are connected by high voltage wires 22 and 23 to the conductors 24 and 25 of the roosting cord 40, shown in FIG. 3 and FIG. 4, or conductors 26, 27 and 28 of the roosting tape 41, shown in FIG. 5 and FIG. 6.

Many materials and techniques were tried in an attempt to develop a single cord roosting system where the parallel conductors 24 and 25 are placed into a spiral configuration around the outside of a central cord 30 to form an easily installed and efficient killing system. The roosting cord 40 has to maintain the spacing of the parallel conductors 24 and 25, and provide sufficient killing power over long distances. In the preferred embodiment, the conductors 24 and 25 are 20 AWG or 22 AWG nickel silver coated solid copper wires spaced 3/16" apart over a round 3/16" or 7/32" polypropylene or nylon core 30 that is white, yellow, or other bright, fly attracting color. The conductors 24 and 25 must have low electrical resistance to provide the necessary killing power over distances of up to 2500' and to spread and thus dissipate any heat generated by electrical arcs across a fly or other object that contacts both conductors 24 and 25. The diameter of the conductors 24 and 25 was chosen to be as large as possible and still be easily handled in the braiding machinery necessary to fabricate the roosting cord 40 inexpensively. A larger wire cannot be easily handled in the braiding machinery and a smaller wire will break during the braiding process. Solid copper wire is used as the conductor material as it has low electrical resistance and is readily formed around the core 30. The solid copper wire is coated with nickel silver to add attractivness for the fly and prevent the copper from tarnishing in the environment. Stainless steel wire will maintain its luster in the environment but has very high electrical resistance and is not flexible enough to be formed around an insulating core as is necessary in this embodiment. The roosting cord 40 must be moisture proofed to maintain proper operation in the intended environment. The roosting cord 40 is moisture proofed by emersing the cord 40 into a solution of Thompson's Water Seal.

A roosting tape 41 as shown in FIG. 5 and FIG. 6 can also be connected by the high voltage wires 22 and 23 to the secondary 19 of the HV transformer 17. The parallel conductors 26, 27 and 28 are nickel silver coated copper, 20 AWG to 24 AWG, spaced 3/16" apart and woven into a polypropylene or nylon tape 31 that is 5/16" to 3/4" wide. The tape 31 must be moisture proofed to prevent damage from humidity and maintain proper operation in the intended environment. In practice, conductors 26 and 29 are connected to one HV wire 22 or 23 and conductor 27 to the other HV wire 22 or 23.

In another embodiment only two conductors 26 and 27 are woven into the roosting tape 41. In this embodiment conductor 26 is connected to either HV wire 22 or 23 and conductor 27 connected to the other HV wire 22 or 23.

The use of stainless steel wire as the conductors 24,25, 26,27, and 28 for either the roosting cord 40 or the roosting tape 41 was totally unsatisfactory. The high resistance of the stainless steel limited the length of the roosting cord 40 or the roosting tape 41 to less than 300 feet and the high resistance will cause the wire to intensly heat at the point of an arc caused by a fly or humidity or moisture which will melt the insulating material even if it is Kevlar. Stainless steel is also a very stiff wire which made the weaving process very difficult. Therefore, in the preferred embodiment, the conductors 24,25,26,27 and 28 are nickel silver coated solid copper wire braided over a polypropylene core 30 or woven into a nylon tape 31. The roosting cord 40 or roosting tape 41 is then moisture proofed prior to installation. This prevents internal arcing due to humidity and thus the destruction of the cord 40 or the tape 41 and results in a roosting means that gives maximum killing surface per linear foot, is efficient, easy to install, inexpensive and attractive to the fly. The roosting cord 40 or roosting tape 41 described herein can also be used with the electronic control unit described in U.S. Pat. No. 5,325,624 to increase its effectiveness. The roosting cord 40 is preferred over the roosting tape 41 because it is more attractive as a roosting site for the fly.

Operation

When the installation is complete, the electronic circuit 10 will have its input connected to a battery 11 which is the source of power for the system. The high voltage wires 22 and 23 from the electronics circuit 40 will be connected to the conductors 24 and 25 of the roosting cord 40. These conductors 24 and 25 will be energized by the electronics circuit 10 and will have a burst of 8 KV peak-to-peak voltage oscillations present between them for 80 milliseconds every 3.5 seconds. This burst of high voltage oscillations will destroy the nervous system of any fly that is in contact with the conductors 24 and 25 and cause death of the fly.

Summary, Ramifications and Scope

Thus a device is provided for controlling fly populations while at the same time providing a device which is safe for use around humans, safe for use in nearly any environment and which is inexpensive to produce, inexpensive to install, inexpensive to operate and which requires very low maintenance.

Accordingly, the reader will see that the apparatus of this invention can be used to control the population of flies within an animal or poultry shelter, waste management or processing facility. In addition, the reader will see that the techniques and apparatus described in this invention are not only safe, effective and inexpensive but also represents a clearly marketable product.

Although the description above contains many specifications, these should not be construed as limiting the scope of the invention but merely providing illustrations of the presently preferred embodiments of this invention. It is understood that the invention may be modified in many ways within the scope of the appended claims. In particular, it is to be understood that the invention is not limited to the specific embodiment wire configuration, electric circuitry, pulse width and timing, or to the numerical values employed in describing this invention. Furthermore, many other types of components may be employed in practicing the invention in place of those which have been specifically described.

We claim:

1. A device for controlling the population of flies within a building by applying bursts of high voltage oscillations to destroy the nervous system of the flies, said device comprising:

(a) an electronic circuit means for generating bursts of high voltage oscillations with sufficient power to destroy the nervous system of a fly, said bursts being of insufficient power to cause ignition of materials within the vicinity of said building, said circuit means having: a high-voltage transformer having a primary coil and a secondary coil; an oscillator to generate square wave oscillations; a gate timer to generate a brief gating pulse; a logic AND to logically AND said oscillations and said gate timing pulses; a MOSFET switch connected between said logic AND and said primary coil to control the current through said primary coil;

(b) roosting means connected to said secondary winding providing a roosting surface for said flies, said roosting means having a pair of low resistance parallel conductors spiral wound around a central core, said parallel conductors being nickel silver coated copper, said roosting means extending between two points within said building, said parallel conductors being spaced ³⁄₁₆" apart; whereby when a DC power source is applied to said electronic circuit means, said oscillator has a frequency of 60 HZ and said gate timer produces a pulse of approximately 80 milliseconds which occur once every 3 to 4 seconds and therefore high voltage oscillations are present in said transformer secondary coil and across said conductors of said roosting means only during said 80 milliseconds.

2. A device for controlling the population of flies within a building by applying bursts of high voltage oscillations to destroy the nervous system of the flies, said device comprising:

(a) an electronic circuit means for generating bursts of high voltage oscillations with sufficient power to destroy the nervous system of a fly, said bursts being of insufficient power to cause ignition of materials within the vicinity of said building, said circuit means having: a high-voltage transformer having a primary coil and a secondary coil; an oscillator to generate square wave oscillations; a gate timer to generate a brief gating pulse; a logic AND to logically AND said oscillations and said gate timing pulses; a MOSFET switch connected between said logic AND and said primary coil to control the current through said primary coil;

(b) roosting means connected to said secondary winding providing a roosting surface for said flies, said roosting means having at least two low resistance parallel conductors woven into an insulating flat tape, said roosting means extending between two points within said building, said parallel conductors being spaced ³⁄₁₆" apart; and are nickel silver coated copper; whereby when a DC power source is applied to said electronic circuit means, said oscillator has a frequency of 60 HZ and said gate timer produces a pulse of approximately 80 milliseconds which occur once every 3 to 4 seconds and therefore high voltage oscillations are present in said transformer secondary coil and across said conductors of said roosting means only during said 80 milliseconds.

3. A system as defined in claim 2 wherein the roosting means connected to said secondary winding providing a roosting surface for said flies, said roosting means having at least two low resistance parallel conductors woven in an insulating flat tape, said roosting means extending between two points with said building, said parallel conductors be spaced ³⁄₁₆" apart; and are nickel silver coated copper.

* * * * *